F. M. ROUSH.
Portable Stirrers for Cooking-Vessels.

No. 160,033.  
Patented Feb. 23, 1875.

Witnesses.  
D. P. Cowl  
Edmund Masson

Inventor:  
Francis M. Roush.  
By Atty. A. B. Stoughton.

THE GRAPHIC CO. PHOTO-LITH. 39 & 41 PARK PLACE, N.Y.

UNITED STATES PATENT OFFICE.

FRANCIS M. ROUSH, OF MASSILLON, OHIO.

IMPROVEMENT IN PORTABLE STIRRERS FOR COOKING-VESSELS.

Specification forming part of Letters Patent No. 160,033, dated February 23, 1875; application filed February 2, 1875.

*To all whom it may concern:*

Be it known that I, FRANCIS M. ROUSH, of Massillon, in the county of Stark and State of Ohio, have invented certain new and useful Improvements in Portable Stirrers applicable to any kind of heating or cooking vessels or vats; and I do hereby declare the following to be a full, clear, and exact description of the same, reference being had to the accompanying drawings making a part of this specification, in which—

Figure 1:
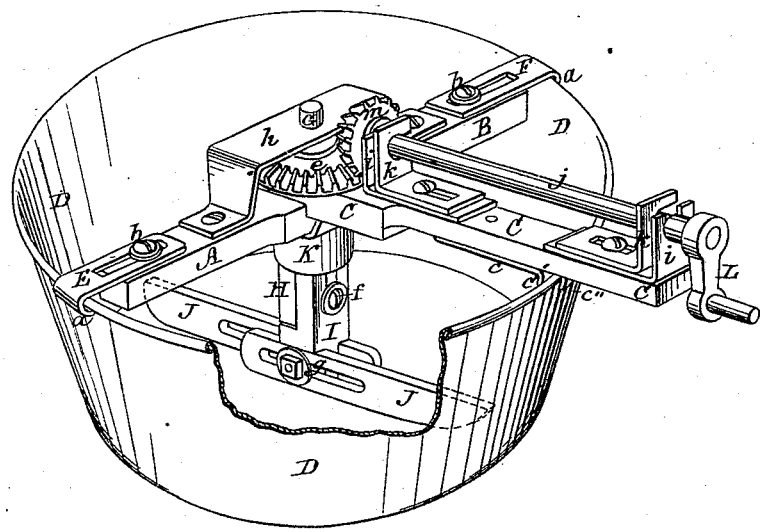
Figure 2:
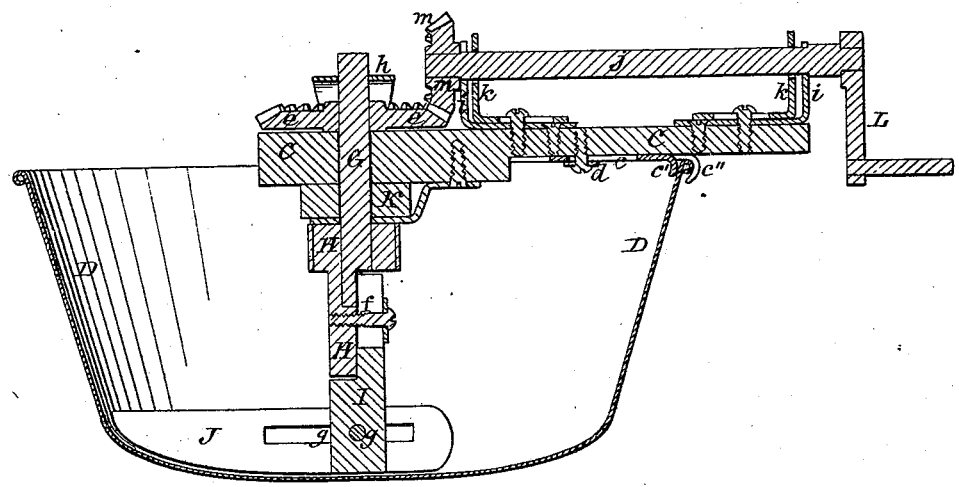

Figure 1 represents, in perspective, the portable stirrer as attached to a kettle for agitating the contents thereof, the kettle being represented with a portion of it broken away to better see the arrangement of the stirrers within. Fig. 2 represents a vertical section through the stirring apparatus, and through the kettle to which it is attached.

My invention relates to a portable geared or power stirring apparatus, capable of being attached and held to any ordinary vessel in which cooking, boiling, heating, and agitating is to be done, and readily removable for cleansing or reapplication elsewhere, as will be explained in connection with the drawings.

The arms A, B, and C form the frame-work of the stirrer. Of these arms those A are secured to the edge of the kettle D by adjustable plates E and F, which have their outer ends $a$ $a$ bent, so as to catch over and hold upon the edge of the kettle. The plates E F are made adjustable on their respective arms, as at $b$, so as to be adaptable to kettles of different diameters. On the under side of the arm C, which is longer than those A B, and extends beyond the edge of the kettle, there is a holding-piece, $c$, which is split and bent at its outer end, so that one part of it, $c'$, shall bear against the inside of the kettle, and the other part, $c''$, hook over the outer edge thereof. This holding-piece $c$ is also made adjustable upon its arm by a slot and set-screw at $d$, and when it is placed and fastened by its set-screw it holds the whole frame firmly and centrally to the kettle. In the frame A B C is arranged a shaft or spindle, G, upon which there is fastened a bevel-gear wheel, $e$, and upon the lower end of this spindle or shaft there is a carrying-block, H, to which is adjustably attached, as at $f$, the piece I, to which the stirring-arms J J are attached, and made adjustable, as at $g$. There is a bearer at $h$ to support the upper end of the shaft or spindle G, and a collar, K, below the arms, to hold, with the aid of the bevel-gear $e$, the stirring mechanism to the frame A B C. Upon the arm C are arranged bearers $i$ $i$, with vertical openings or slots to receive the shaft $j$, and upon the bearers $i$ $i$ are arranged bearers or holders $k$ $k$, having horizontal openings or slots that take in the shaft $j$, and so hold said shaft firmly in its working position, while, by slacking the screws $l$ $l$, and swinging the holders $k$ $k$ slightly, the shaft can be removed with its connected parts for cleansing or other purposes. On the extreme outer end of the shaft $j$ there is a crank, L, by which said shaft is rotated, and upon its inner end a beveled pinion, $m$, which gears with the bevel-wheel $e$ on the stirrer-shaft G, and so drives the stirrer-arms J.

The apparatus is portable, and can be fitted, held, and adjusted to any ordinary-sized kettle, both diametrically and vertically. It is, moreover, readily detached, and can be taken apart for cleansing.

Having thus fully described my invention, what I claim therein as new is—

The within-described portable stirring apparatus, consisting of the combination of the radial arms A B C, having adjustable holders $a$ $c$, the stirrer-shaft and stirrers adjustable to and on said shaft, and the driving mechanism, all supported and sustained on said radial arms, as and for the purpose described and represented.

FRANCIS M. ROUSH.

Witnesses:
  ISAAC ULMAN,
  L. C. COLE.